United States Patent [19]
Kühling et al.

[11] Patent Number: 5,767,224
[45] Date of Patent: *Jun. 16, 1998

[54] TWO-STEP PROCESS FOR THE PRODUCTION OF THERMOPLASTIC POLYCARBONATE

[75] Inventors: Steffen Kühling, Meerbusch; Klaus Schebesta, Leverkusen; Uwe Hucks, Alpen; Martin Ullrich; Heinrich Schuchardt, both of Leverkusen; Rolf Bachmann, Bergisch Gladbach; Thomas Fischer, Krefeld; Klemens Kohlgrüber, Kürten; Franz Ferdinand Rhiel, Dormagen; Gottfried Zaby, Leverkusen, all of Germany

[73] Assignee: Bayer Aktiengesellschaft, Leverkusen, Germany

[ * ] Notice: The term of this patent shall not extend beyond the expiration date of Pat. No. 5,652,313.

[21] Appl. No.: 823,792

[22] Filed: Mar. 24, 1997

[30] Foreign Application Priority Data

Mar. 27, 1996 [DE] Germany ............... 196 12 139.6

[51] Int. Cl.$^6$ .................................................. C08G 64/00
[52] U.S. Cl. ............... 528/196; 528/198; 528/199; 528/200
[58] Field of Search .................. 528/196, 198, 528/199, 200

[56] References Cited

U.S. PATENT DOCUMENTS

| 5,373,082 | 12/1994 | Kauth et al. | 528/196 |
| 5,652,313 | 7/1997 | Kühling et al. | 526/65 |

*Primary Examiner*—Terressa M. Mosley
*Attorney, Agent, or Firm*—Connolly and Hutz

[57] ABSTRACT

The invention relates to a two-step melt process for the production of thermoplastic, solvent-free, low-branching polycarbonates with low —OH terminal group content using a self-cleaning high-viscosity reactor.

10 Claims, No Drawings

TWO-STEP PROCESS FOR THE PRODUCTION OF THERMOPLASTIC POLYCARBONATE

The invention relates to a process for the production of solvent-free, low-branching polycarbonate by the melt transesterification process, starting from aromatic diphenols, carboxylic acid diaryl esters, catalysts and optionally branching agents, in which, in a first step for the production of oligocarbonate, nitrogen or phosphorus bases are used in quantities of $10^{-4}$ to $10^{-8}$ mol, based on 1 mol diphenol, and an oligocarbonate is produced after adding the catalyst under a pressure of 100 Pa to atmospheric pressure and an increase in temperature to up to 290° C., distilling off monophenol, the oligocarbonate formed as an intermediate having an —OH terminal group content of 10% to 35 mole %, and in a subsequent step this is polycondensed to the polycarbonate at a temperature of 240° C. to 340° C., preferably of 260° C. to 330° C. and particularly preferably of 280° C. to 320° C. and under a pressure of 1 to 50 000 Pa in 10 to 60 minutes, the second step being carried out in a special high-viscosity reactor, which has a high degree of self-cleaning and a large free effective volume.

The polycarbonates produced by the process according to the invention are low-branching, solvent-free, with light inherent colour and possess low —OH terminal group contents.

Quaternary ammonium and phosphonium compounds are described as catalysts for melt transesterification in patent specification U.S. Pat. No. 3,442,854. In the polycondensation step in the known process, however, a reaction temperature of >300° C. was applied for several hours (more than 4 hours) in order to obtain high-molecular-weight polycarbonate. The resulting products are not low-branching (cf. comparative examples 1 and 2) and the space-time yield is, moreover, unsatisfactory. Also, a self-cleaning high-viscosity reactor is not used.

In U.S. Pat. No. 5,412,061 a transesterification process is described for the production of polycarbonate in which tetraorganophosphonium carboxylates are used as catalysts.

In this process the polycondensation is carried out in a kettle with a polycondensation time of approx. 90 minutes.

The —OH terminal group content of the polycarbonates obtainable by this process is comparatively high. Working in a kettle causes the occurrence of fish eyes or swollen inclusions in the product owing to product deposition or undesirable side reactions on the walls. The comparatively long reaction time also leads to undesirable branching in the end product.

It was found that, by setting a certain —OH/aryl carbonate terminal group ratio of the oligocarbonates formed as intermediates and by two-step catalysis, a low-branching polycarbonate low in —OH terminal groups can be produced in a short polycondensation period with economical throughput if a self-cleaning, high-viscosity reactor with a high degree of self-cleaning and large free effective volume is used in the second step of the transesterification.

The invention relates to a two-step process for the production of low-branching polycarbonate by melt transesterification of diphenols and carboxylic acid diaryl esters in the presence of catalyst and optionally branching agents, characterised in that, in the first step for the production of oligocarbonate, nitrogen or phosphorus bases are added in a quantity of $10^{-2}$ to $10^{-8}$ mol, based on 1 mol diphenol, to the mixture of diphenol and carboxylic acid diaryl ester, after adding the catalyst the temperature of the mixture is brought to up to 290° C., under a pressure of 100 Pa to normal pressure, and monophenols liberated during the reaction are distilled off, the oligocarbonate produced in the first step having an —OH terminal group content of 10% to 35 mole %, that in the second step the oligocarbonate is polycondensed to the polycarbonate at a temperature of 240° to 340° C., preferably of 275° C. to 330° C., especially of 280° to 310° C. and under a pressure of 1 to 50 000 Pa within 10 to 60 minutes in a self-cleaning high-viscosity reactor with a degree of self-cleaning (area-based) of >95%, especially >98%, and a free effective volume of at least 50%, preferably ≧65%, particularly preferably ≧75%.

Low-branching polycarbonate in the sense of the process according to the invention means that the content of branching agents of formula (I)

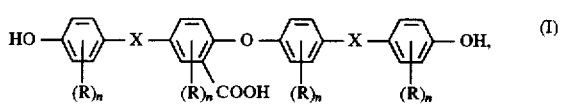

where $X=C_1-C_8$ alkylidene or cycloalkylidene, S or a single bond and $R=CH_3$, Cl or Br and n is zero, 1 or 2, in the polycarbonate does not exceed a value of 75 ppm after total saponification of the PC and HPLC determination of the saponification products.

Suitable diphenols for the process according to the invention are those of formula (II)

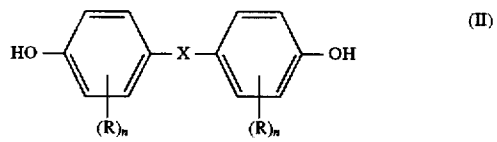

where X, R and n have the meanings given for the definition of formula (I).

Preferred diphenols are e.g.
4,4'-dihydroxydiphenyl,
4,4'-dihydroxydiphenyl sulphide,
2,2-bis(4-hydroxyphenyl)propane
2,2-bis(3,5-dimethyl-4-hydroxyphenyl)propane
2,2-bis(3,5-dichloro-4-hydroxyphenyl)propane
2,2-bis(3,5-dibromo-4-hydroxyphenyl)propane
1,1-bis(4-hydroxyphenyl)cyclohexane and
1,1-bis(4-hydroxyphenyl)-3,3,5-trimethylcyclohexane.

Particularly preferred diphenols from those named above are 2,2-bis(4-hydroxyphenyl)propane and 1,1-bis(4-hydroxyphenyl)-3,3,5-trimethylcyclotexane.

Carboxylic acid diaryl esters in the sense of the present invention are di-$C_6$-$C_{14}$-aryl esters, preferably the diesters of phenol or alkyl-substituted phenols, i.e. diphenyl carbonate or e.g. dicresyl carbonate. Based on 1 mol bisphenol the carboxylic acid diesters are used particularly in quantities of 1.01 to 1.30 mol, preferably of 1.02 to 1.15 mol.

It should be ensured that the reaction components for the first step (oligocarbonate synthesis), i.e. the diphenols and the carboxylic acid diaryl esters, are largely free from alkali and alkaline earth ions, quantities of less than 0.1 ppm of alkali and alkaline earth ions being tolerable. Such pure diphenols and carboxylic acid diaryl esters are obtainable e.g. by recrystallising, washing and distilling the carboxylic acid diaryl esters and diphenols. In the process according to the invention the content of alkali and alkaline earth metal ions both in the diphenol and in the carboxylic acid diester should be <0.1 ppm. The total chlorine content of the raw materials should not exceed a value of 2 ppm and the content of saponifiable chlorine in the carboxylic acid diester should not exceed a value of 0.05 ppm. For the colour of the resulting polycarbonate it is especially advantageous if the raw materials, i.e. the diphenols and the carboxylic acid diaryl esters, have not passed through the solid phase in the case of purification of the raw materials by distillation in the final step of production. i.e. a melt or mixed melt of the raw materials is used in the transesterification reaction or at least one of the raw materials is metered in liquid form.

The polycarbonates may be branched in a conscious and controlled fashion by using small quantities of branching agents. Some suitable branching agents are:

phloroglucinol,
4,6-dimethyl-2,4,6-tri(4-hydroxyphenyl)heptene-2,
4,6-dimethyl-2,4,6-tri(4-hydroxyphenyl)heptane,
1,3,5-tri(4,hydroxyphenyl)benzene,
1,1,1-tri(4-hydroxyphenyl)ethane,
tri(4-hydroxyphenyl)phenylmethane,
2,2-bis[4,4-bis(4-hydroxyphenyl)cyclohexyl]propane,
2,4-bis(4-hydroxyphenylisopropyl) phenol,
2,6-bis(2-hydroxy-5'-methylbenzyl)-4-methylphenol,
2-(4-hydroxyphenyl)-2-(2,4-dihydroxyphenyl)propane,
hexa(4-(4-hydroxyphenylisopropyl)phenyl) orthoterephthalate,
tetra-(4-hydroxyphenyl)methane,
tetra-(4-(4-hydroxyphenylisopropyl)phenoxy)methane,
1,1-bis(4',4"-dihydroxytriphenyl)methyl)benzene and especially
α,α',α"-tris(4-hydroxyphenyl)-1,3,5-triisopropylbenzene.

Other possible branching agents are 2,4-dihydroxybenzoic acid, trimesic acid, cyanuric chloride and 3,3-bis(3-methyl-4-hydroxyphenyl)-2-oxo-2,3-dihydroindole.

Low-branching polycarbonate in the sense of the invention is understood as a polycarbonate in which the occurrence of uncontrolled branchings, e.g. owing to undesirable side reactions, is prevented.

The conscious branching by the addition of branching agents e.g. such as described above is differentiated therefrom.

The 0.05 to 2 mole %, based on diphenols used, of branching agents optionally to be incorporated may be used together with the diphenols.

For the oligocarbonate synthesis, nitrogen and phosphorus bases are used as catalysts, preferably ammonium and phosphonium catalysts and guanidine and phosphazene bases.

Preferred catalysts in the sense of the process according to the invention for the production of the oligocarbonate step are compounds of the general formulae (III) and (IV)

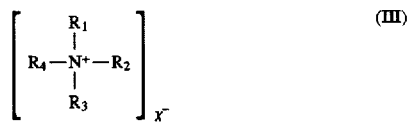
(III)

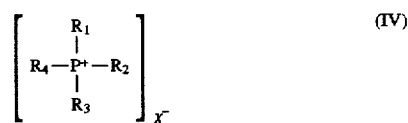
(IV)

where $R_1$ to $R_4$ are the same or different alkyl, aryl or cycloalkyl groups and $X^-$ is an anion of an acid in which the corresponding acid-base pair $H^+ + X^- \rightleftharpoons HX$ possesses a $pK_B$ of <11.

Particularly suitable catalysts in the sense of the process according to the invention are for example:

tetramethylammonium hydroxide, tetramethylammonium acetate, tetramethylammonium fluoride, tetramethylammonium tetraphenyl hydridoborate, tetraphenylphosphonium fluoride, tetraphenylphosphonium tetraphenyl hydridoborate, dimethyldiphenylammonium hydroxide, tetraethylammonium hydroxide, DBU, DBN or guanidine system such as for example 1,5,7-triazabicyclo[4.4.0]dec-5-ene, 7-phenyl-1,5,7-triazabicyclo[4.4.0]dec-5-ene, 7-methyl-1,5,7-triazabicyclo[4.4.0]dec-5-ene, 7,7'-hexylidene-di-1,5,7-triazabicyclo[4.4.0]dec-5-ene, 7,7'-decylidene-di-1,5,7-triazabicyclo[4.4.0]dec-5-ene, 7,7'-dodecylidene-di-1,5,7-triazabicyclo[4.4.0]dec-5-ene or phosphazenes such as for example the phosphazene base $P_1$-t-Oct=tert.-octylimino-tris(dimethylamino) phosphorane, phosphazene base $B_1$-t-Butyl I tert.-butylimino-tris(dimethylamino) phosphorane, BEMP=2-tert-butylimino-2-diethylamrino-1,3-dimethylperhydro-1,3,2-diazaphosphorine.

The catalyst is used in quantities of $10^{-2}$ to $10^{-8}$ mol, based on 1 mol diphenol. Catalysts may also be used in combination of two or more different ones together.

The oligocarbonates of the first step preferably have an average molecular weight $M_w$ of 9000 to 24 000, particularly preferably of 12 000 to 20 000, determined by measuring the relative viscosity of a solution in dichloromethane (at 25° C. and a concentration of 5 g/l) or in mixtures of equal quantities by weight of phlenol/o-dichlorobenzene calibrated by light scattering. All statements of molecular weight refer to the number average unless otherwise stated. The molecular weight of the oligocarbonates of the 1st step depends on what the desired final viscosity of the polycarbonate of the second step is to be; thus low-molecular-weight polycarbonates are obtained in the second step by the condensation of low-molecular-weight oligocarbonates and higher-molecular-weight polycarbonates by the condensation of higher-molecular-weight oligocarbonates. The oligocarbonates produced in this way must have a content of —OH terminal groups of 10% to 35%, preferably of 15% to 30%, corresponding to:

$$X\% = \frac{\text{number of -OH terminal groups}}{\text{total number of terminal groups}} \cdot 100$$

The —OH/aryl carbonate terminal group ratio of the oligocarbonates was established e.g. by separate determination of the —OH terminal groups by means of photometric determination with $TiCl_4$ on the one hand and establishing the aryl carbonate terminal groups by HPLC determination of the monophenol formed after total saponification on the other hand.

The temperature for the production of these oligocarbonates is preferably from 100° C. to 290° C., preferably from 150° C. to 280° C. The monophenols resulting from the transesterification of oligocarbonate are removed under a pressurized of 50 Pa to normal, pressure preferably of 100 to 50 000 Pa especially by distillation.

In the second step, the polycondensation of the oligocarbonate, it may be advantageous for the production of higher-molecular-weight polycarbonates (e.g with a molecular weight $M_w$>24 000) also to add alkali/alkaline-earth metal catalyst to the oligocarbonate. The alkali/alkaline-earth metal catalysts are preferably used in quantities of $10^{-8}$ to $10^{-4}$ mol based on 1 mol diphenol, particularly preferably in a concentration of $10^{-7}$ to $10^{-5}$ mol. They are for example lithium, sodium, potassium, caesium, calcium, barium, magnesium hydroxides, carbonates, halides, phenolates, diphenolates, fluorides, acetates, phosphates, hydrogen phosphates, hydridoborates.

The alkali/alkaline-earth metal catalyst may be added e.g. as a solid or as a solution or masterbatch e.g. in water, phenol, diaryl carbonate, oligocarbonate or polycarbonate.

The invention thus also relates to the incorporation of alkali or alkaline earth catalysts.

The second step of the process according to the invention, the polycondensation, is carried out in 10 to 60 minutes in a special high-viscosity reactor. Reactors with a large free effective volume, which clean themselves kinematically, are used for this purpose. As the shafts of these mixers rotate, the boundaries of the product space, e.g. the structural elements: scrapers, support elements, shafts or housing, are largely or completely cleaned kinematically by mutual combing in the context of the mechanical movements. Suitable high-viscosity reactors are described e.g. in the European patent applications EP 460 466, EP 528 210, EP 638 354 and in the German patent applications with the application numbers P 44 43 151.1 and P 44 43 154.6.

For use in the process according to the invention it is advantageous for the high-viscosity reactors described to possess a free effective volume sufficiently large on the one hand to permit sufficiently long product residence times, to possess good, effective discharge capacity so that, on the other hand, they do not cause residence times which are too long and do not subject the product to thermal stress for too long. The reactors to be used according to the invention should spread out large product surfaces and renew these surfaces frequently so that rapid progress of the reaction may be achieved at comparatively low temperature. A surface of the liquid phase which is renewed as often as possible makes it easier for the monophenols to pass over into the gaseous phase.

In processes with mass transfer from a liquid into a gaseous phase, which include polycondensation reactions, the following area of particular importance:
1. mass transport within the liquid phase,
2. large surfaces/interfaces made available for mass exchange between the phases and
3. mass transport out of the system in the gaseous phase.

Mass transport from the gaseous phase is usually ensured by suction.

The high-viscosity reactors to be used according to the invention should have as large as possible a wettable metal surface in the reaction chamber which facilitates mass exchange between reaction mixture and gaseous phase.

As the rotors turn, thin films with large surfaces are spread on to the wetted metal surfaces of housing and rotors. A large wettable metal surface is advantageous. The ratio of total wettable surface (rotors and surrounding housing) to surrounding (internal housing) surface may be referred to as a dimension independent of the size of the apparatus. In order to ensure comparability here, the housing should be taken as surrounding the rotors, i.e. without including extended vapour pace.

High-viscosity reactors which have a ratio of total surface/surrounding housing surface of >2.5 preferably >3 are preferably used in the process according to the invention.

The other aspect, the thorough mixing in the liquid phase, is also determined by the combined action of the rotors. The kinematics of their action is significant here: in order to avoid dead volumes in which product is retained for an undefined length of time, the rotors should scrape the housing and one another as completely as possible. In order to quantify the kinematic self-cleaning, an area-based degree of self-cleaning is defined which gives the proportion of the kinematically cleaned areas in relation to the total surface of the reactor in contact with product. This is >95%, preferably >98%. A volume-based degree of self-cleaning may also be defined in a similar way. The volume-based degree of self-cleaning is the ratio of the difference between free effective volume minus uncleaned volume and free effective volume. In the preferred process the ratio is >85%, taking into account a clearance of scrapers etc. of 1%, based on the housing diameter, or >94% assuming a clearance of 0. Uncleaned volume here means the maximum possible volume of deposits on surfaces which are not kinematically cleaned (which is not removed by kinematics). These volumes represent dead volumes in which the product remains with an increased residence time and can only be exchanged gradually and in an undefined manner by flow forces.

In order to be able to carry out processes which require a certain residence time economically with large throughputs, it is now advantageous to use reactors with large product-holding volume. In order to keep the product-holding volume as large as possible for the same construction size, the rotors should therefore fill the smallest possible volume. The free effective volume as a ratio of internal housing volume with rotors installed to internal volume housing volume with rotors not installed is referred to as the dimension. In the process according to the invention it is at least 50%, preferably ≧65%, especially ≧75%, for the high-viscosity reactor.

By combining the features according to the invention, economic throughput can be achieved with, at the same time, good product properties as described in the process according to the invention.

The aromatic polycarbonates obtainable by the process according to the invention, to which the invention also relates, should have an average molecular weight $M_w$ of 18 000 to 60 000, preferably of 19 000 to 40 000, established by measuring the relative viscosity of a solution in dichloromethane or in mixtures of equal quantities by weight of phenol/o-dichlorobenzene calibrated by light scattering.

This is achieved in that preferred low-molecular-weight oligocarbonates are polycondensed to low-viscosity polycarbonate by monophenol distillation and higher-molecular-weight oligocarbonates to higher-viscosity polycarbonates.

The —OH terminal group content of the resulting polycarbonate is particularly <20%, preferably <15%, particularly preferably <10% and especially preferably <5%.

In order to limit the weight-average molecular weights $M_w$ of the polymers, molecular weight regulators, such as for example alkyl phenol, may be used in known manner (cf. e.g. EP 360 578) in the calculated quantities.

In addition, for special applications the modification of the polycarbonates by incorporating blocks, segments and comonomers is also possible, e.g. siloxane blocks with —OH terminal groups, aromatic and aliphatic polyesters with —OH and carboxylic acid terminal groups, polyphenylene sulphide blocks with —OH terminal groups, polyphenylene oxide blocks with —OH terminal groups.

The usual stabilisers against UV light or heat and for example mould release agents may also be added to the polycarbonates produced in accordance with the invention. They may be blended with other thermoplastics, for example with ABS, in known manner.

EXAMPLES

Comparative Example 1

114.15 g (0.500 mol) of bisphenol A and 113.54 g (0.530 mol) of diphenyl carbonate are weighed into a 500 ml three-neck flask with stirrer, internal thermometer and Vigreux column (30 cm, metallised) with bridge. The apparatus is freed from atmospheric oxygen by evacuating and flushing with nitrogen (3 times) and the mixture is heated up to 150° C. 0.0039 g of $N(CH_3)_4B(C_6H_5)_4$ ($2 \cdot 10^{-3}$ mole %) based on bisphenol A is now applied as a solid and the resulting phenol is distilled off at 10 000 Pa. At the same time the temperature is increased up to 250° C. After 1 hour the pressure is reduced to 1 000 Pa. By further reducing the pressure to 50 Pa and increasing the temperature to 310° C. the polycondensation is achieved in 4 h. A light-coloured, solvent-free polycarbonate is, obtained with a relative viscosity in solution of 1.276 (dichloromethane., 25° C., concentration 5 g/l). The content of branching agents of formula (V) in the polycarbonate produced is 210 ppm.

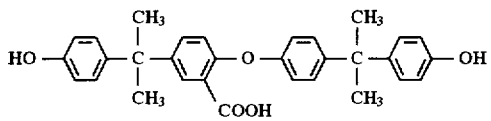

(V)

Comparative Example 2

The procedure is as in comparative example 1 but the polycondensation temperature is 320° C. A light-coloured, solvent-free polycarbonate is obtained with a relative viscosity in solution of 1.335 (dichloromethane, 25° C., 5 g/l). The content of branching agents of formula (V) in the polycarbonate produced is 410 ppm.

Examples 1 and 2

The raw materials diphenyl carbonate (DPC) and bisphenol A (BPA) may be melted together in a semi-technical pilot plant after inerting with nitrogen. It is also possible to take delivery of raw materials supplied in liquid form.

When added separately (raw materials supplied in liquid form), 49.37 kg BPA/h and 52.83 kg DPC/h, when melted together 102.2 kg melt (consisting of 175 parts by weight BPA and 187.25 parts by weight DPC)/h are fed into the multi-step pilot plant.

As catalyst, $PPh_4BPh_4$ as a 1% solution in phenol is continuously mixed in before entering the reactors (142 g solution/h, corresponding to $1 \cdot 10^{-3}$ mole %).

The melt is heated to 190° C. via a heat exchanger and after 20 min residence time it is devolatilised via a tubular evaporator into a separator with stirrer under a vacuum of 150 mbar and simultaneously heated to 240° C. The residence time in the separator is 25 min. The vapours are passed through a column into a condenser. From the separator the oligocarbonate is conveyed into a disc reactor. The temperature is adjusted to 280° C. and the pressure to 50 Pa. The residence time is 35 min. $5 \cdot 10^{-4}$ mole % sodium phenolate is continuously added to the resulting oligocarbonate as catalyst in the form of a 0.1 wt. % masterbatch in polycarbonate (126 g/h) and it is conveyed into the high-viscosity reactor according to the invention. Condensing up to high-molecular-weight polycarbonate takes place under 20 Pa and at temperatures of 295° C. at 26 rpm. The residence time is 23 min. The vapours from both reactors are passed into cooled separators. The resulting polycarbonate is drawn off as bristle and granulated.

Table 1 shows the properties of the polycarbonates produced in accordance with examples 1 and 2.

The "Yellowness Index" mentioned in table 1 was taken from ASTM Designation: D1925-70 (Reapproved 1988) from "Annual Book of ASTM Standards" vol. 08.02 (1991) p. 150 and gives the criterion for the optical quality of a transparent plastic.

TABLE 1

| | BPA | DPC | $\eta_{rel}$ relative viscosity oligo-carbonate | —OH content [ppm] oligo-carbonate | —OH in mole % of terminal groups | $\eta_{rel}$ poly-carbonate | —OH content [ppm] poly-carbonate | —OH in mole % of terminal groups | Proportion of branching, agents of formula (V) [ppm] | Yellowness Index |
|---|---|---|---|---|---|---|---|---|---|---|
| Example | | | | | | | | | | |
| 1 | delivered as liquid (170° C.) | delivered as liquid (110° C.) | 1.215 | 660 | 21 | 1.296 | 190 | 8 | 17 | 1.22 |
| 2 | melted together with DPC (150° C.) | ← | 1.209 | 840 | 26 | 1.292 | 290 | 12 | 22 | 1.91 |
| Comparative examples | | | | | | | | | | |
| 1 | solid | solid | | | | 1.276 | 310 | 14 | 210 | 3.6 |
| 2 | solid | solid | | | | 1.335 | 220 | 10 | 410 | 4.2 |

We claim:

1. Two-step process for the production of low-branching polycarbonate by melt transesterification of diphenols and carboxylic acid diaryl esters in the presence of catalyst and optionally branching agents, characterised in that nitrogen or phosphorus bases are added in a quantity of $10^{-2}$ to $10^{-8}$ mol, based on 1 mol diphenol, to the mixture of diphenol and carboxylic acid diaryl ester in the first step for the production of oligocarbonate, after adding the catalyst the temperature of the mixture is brought up to 290° C., under a pressure of 100 Pa to atmospheric pressure, and monophenols evolved during the reaction are distilled off, the oligocarbonate formed in the first step having an —OH terminal group content of 10 to 35 mol %, that in the second step the oligocarbonate is polycondensed to the polycarbonate at a temperature of 240° to 340° C. and under a pressure of 1 to 50 000 Pa within 10 to 60 minutes in a self-cleaning high-viscosity reactor with an area-based degree of self-cleaning of >95% and a free effective volume of at least 50%.

2. Process for the production of aromatic polycarbonate according to claim 1, characterised in that the content of branching agents of formula (I):

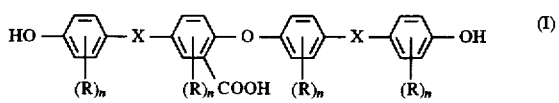

where X stands for $C_1$–$C_8$ alkylidene or cycloalkylidene, sulphur or a single bond, R stands for $CH_3$, Cl or Br and the index n stands for zero, 1 or 2, in the polycarbonate does not exceed a value of 75 ppm after total saponification of the polycarbonate and HPLC determination of the saponification products.

3. Process for the production of aromatic polycarbonate in the melt according to claim 1, characterised in that the second step of the process is carried out with addition of alkali and/or alkaline-earth metal salts in a quantity of $10^{-4}$ to $10^{-8}$ mol, based on 1 mol diphenol.

4. Process for the production of aromatic polycarbonate in the melt according to claim 1, characterised in that the content of phenolic —OH terminal groups in the finished polycarbonate is less than 20 mole %.

5. Process for the production of aromatic polycarbonate in the melt according to claim 1, characterised in that the diphenols and carboxylic acid diaryl esters to be used are left in the liquid phase after their production or purification by distillation until used in the first step of the process.

6. Process according to claim 1, characterised in that in the first step oligocarbonate is produced with a molecular weight (number average) of 9000 to 24000.

7. Process for the production of aromatic polycarbonate according to claim 1, characterised in that the high-viscosity reactor used has a volume-based degree of self-cleaning of more than 85%, taking into account all clearances as uncleaned volume.

8. Process for the production of aromatic polycarbonate according to claim 1, characterised in that the high-viscosity reactor used has an area-based degree of self-cleaning of more than 98%.

9. The process according to claim 1, wherein in the second stage the oligocarbonate is condensed to the polycarbonate at a temperature of 275° to 330° C.

10. The process according to claim 9, wherein in the second stage the oligocarbonate is condensed to the polycarbonate at a temperature of 280° to 310° C.

* * * * *

UNITED STATES PATENT AND TRADEMARK OFFICE
CERTIFICATE OF CORRECTION

PATENT NO. : 5,767,224
DATED : June 16, 1998
INVENTOR(S) : Kühling et al.

Page 1 of 1

It is certified that error appears in the above-identified patent and that said Letters Patent is hereby corrected as shown below:

Claim 1, column 8,
Lines 52-53, the phrase should read: -- the temperature of the mixture is brought to up to 290°C, --.

Signed and Sealed this

Second Day of October, 2001

Attest:

*Nicholas P. Godici*

NICHOLAS P. GODICI
*Attesting Officer*   *Acting Director of the United States Patent and Trademark Office*